United States Patent
Hunt et al.

(10) Patent No.: US 10,932,311 B2
(45) Date of Patent: *Feb. 23, 2021

(54) SECURE AD HOC NETWORK ACCESS

(71) Applicant: Intel IP Corporation, Santa Clara, CA (US)

(72) Inventors: Preston J. Hunt, Portland, OR (US); Emily H. Qi, Gig Harbor, WA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,688

(22) Filed: Jun. 23, 2020

(65) Prior Publication Data

US 2020/0323004 A1    Oct. 8, 2020

Related U.S. Application Data

(63) Continuation of application No. 15/392,746, filed on Dec. 28, 2016, now Pat. No. 10,701,745.

(51) Int. Cl.
*H04W 76/14* (2018.01)
*H04W 48/16* (2009.01)
*H04W 12/08* (2009.01)
*G06K 7/14* (2006.01)
*H04W 12/04* (2021.01)
*H04L 29/06* (2006.01)
*H04W 8/00* (2009.01)
*H04W 84/18* (2009.01)
*H04W 12/00* (2021.01)

(52) U.S. Cl.
CPC .......... *H04W 76/14* (2018.02); *G06K 7/1417* (2013.01); *H04L 63/065* (2013.01); *H04W 12/04* (2013.01); *H04W 8/005* (2013.01); *H04W 12/00522* (2019.01); *H04W 84/18* (2013.01)

(58) Field of Classification Search
CPC ...... H04W 76/14; H04W 48/16; H04W 12/08
USPC .................................................. 726/7
See application file for complete search history.

(56) References Cited

U.S. PATENT DOCUMENTS

2017/0257819 A1*  9/2017  McCann ............... H04W 48/14

* cited by examiner

*Primary Examiner* — Jacob Lipman
(74) *Attorney, Agent, or Firm* — Eversheds Sutherland (US) LLP

(57) ABSTRACT

This disclosure describes systems, methods, and apparatuses related to secure ad hoc network access. A device may identify a cryptographic key received from a second device. The device may cause to send a probe request for service information to the second device. The device may identify a probe response including an information element received in the service information from the second device. The device may cause to send a first discovery request seeking to provision the second device. The device may identify a first discovery response from the second device including a configuration method. The device may cause to form an ad hoc wireless network group based on the first discovery response. The device may cause to exchange one or more messages to provide an access for the second device to the ad hoc wireless network group based on the cryptographic key and one or more in-band attributes.

20 Claims, 7 Drawing Sheets

SECURE AD HOC NETWORK ACCESS

CROSS-REFERENCE TO RELATED APPLICATION

This application is a continuation of U.S. Non-Provisional application Ser. No. 15/392,746, filed Dec. 28, 2016, the disclosure of which is incorporated herein by reference.

TECHNICAL FIELD

This disclosure generally relates to systems, methods, and apparatuses for wireless communications and, more particularly, to secure ad hoc network access between wireless devices.

BACKGROUND

Wireless devices are becoming widely prevalent, making them suited for location-based services. Wireless devices may benefit from location-based services that may result in an enhanced user experience. Recently, there has been a shift in technology to support direct wireless communications between wireless devices.

DETAILED DESCRIPTION

Figure 1:
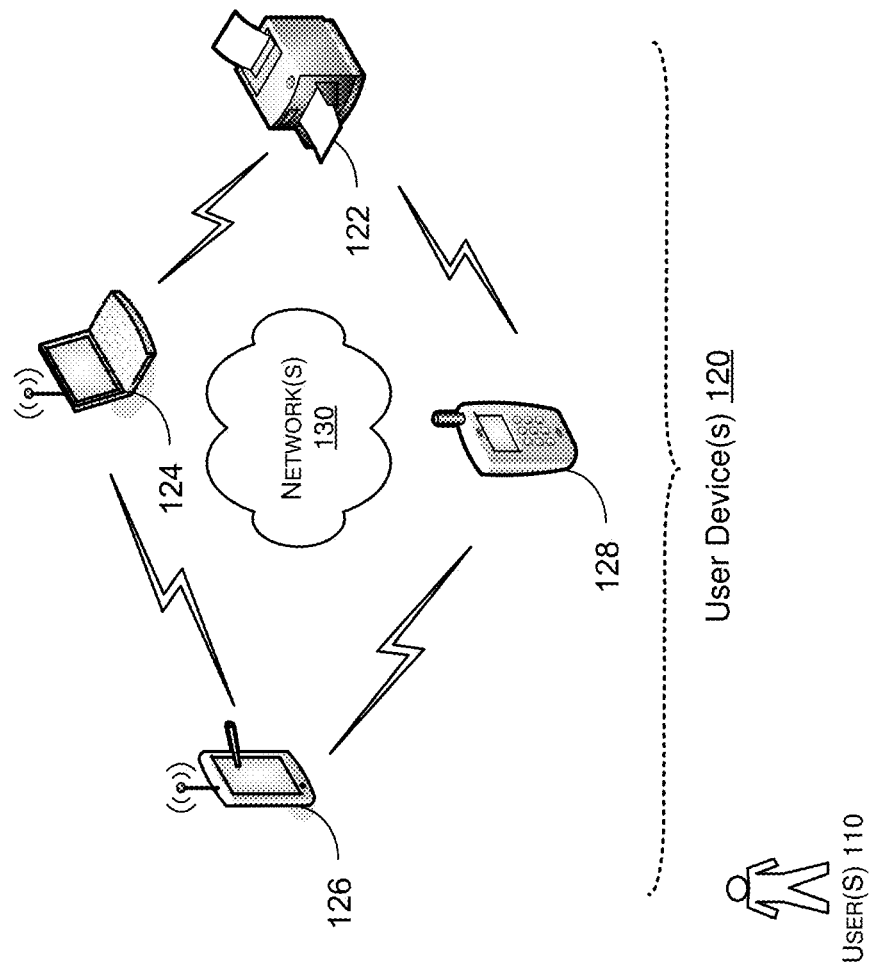
FIG. 1 depicts a network diagram illustrating an example network environment of an illustrative secure ad hoc network access system, in accordance with one or more example embodiments of the disclosure.

Example embodiments described herein provide certain systems, methods, and devices for providing secure ad hoc network access between wireless devices.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device," and "user equipment" (UE) as used herein refer to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, a user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one-way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates a radio frequency identification (RFID) element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MCM), discrete multi-tone (DMT), Bluetooth®, global positioning system (GPS), Wi-Fi, Wi-Max, ZigBee™, ultra-wideband (UWB), global system for mobile communication (GSM), 2G, 2.5G, 3G, 3.5G, 4G, fifth generation (5G) mobile networks, 3GPP, long term evolution (LTE), LTE advanced, enhanced data rates for GSM evolution (EDGE), or the like. Other embodiments may be used in various other devices, systems, and/or networks.

As Wi-Fi technology increases in both technical complexity and a broadening feature set, a common platform allowing interoperability may be necessary in order to support this increase. Additionally, the Wi-Fi alliance ensures that Wi-Fi products (e.g., user devices) from multiple manufacturers work well together. In addition, the existing Wi-Fi Direct services (WFDS) discovery protocol does not provide information to set up an application service platform (ASP) session via an AP infrastructure. The WFDS specification defines the architecture, protocols and functionality for interoperability of Wi-Fi Direct Services. An ASP session is a software service or library that implements the common functions needed by all applications and services conforming to the WFDS specification.

An important area of wireless networking is the ability for devices to form an ad-hoc or unmanaged network between themselves. Wi-Fi Direct is one example of a technology that exists for this purpose. The Wi-Fi Direct Services (WFDS) and Application Service Platform (ASP2) technologies provide a common framework to build services based on Wi-Fi Direct. In WFDS and ASP2, devices exchange and negotiate capability information over a Wi-Fi channel. All connections require wireless security and some form of user verification (most commonly entering a PIN or pushing a button). There are three main challenges to the approach taken by WFDS and ASP2: (1) it is not optimal from a user experience perspective; (2) the security level provided is not very high; and (3) due to many complicating factors, the capability negotiation process often fails, preventing the formation of the ad-hoc network. In the Wi-Fi Alliance, the Device Provisioning Protocol (DPP) task group was formed primarily to address the aforementioned concerns and to accommodate the needs of devices in the emerging Internet of Things (IoT) market. Many IoT devices have neither a display nor any input mechanisms, precluding the use of Wi-Fi Direct as it currently stands due to the requirement for user interaction during security setup. To improve security, DPP uses public key cryptography. In accordance with DPP, each device has a public and private key pair. There is no central certificate authority or chain of trust, so the challenge is in verifying that a public key belongs to the intended device and not to an attacker.

Example embodiments of the present disclosure relate to systems, methods, and devices for a secure ad hoc network access system that facilitates discovery between two user devices using out-of-band (non-Wi-Fi) discovery and Wi-Fi discovery procedures to ensure that the necessary information needed to set up a connection is exchanged between these user devices. For example, out-of-band (non-Wi-Fi) discovery procedure may be carried out using quick response (QR) code discovery using QR protocol(s). The Wi-Fi discovery procedure may be carried out in Peer-to-Peer (P2P) discovery using P2P protocol(s). In one embodiment, the secure ad hoc network access system may provide a mechanism whereby a device's public key, Wi-Fi media access control (MAC) address, and radio operating frequencies may be encoded in a Quick Response (QR) code. The secure ad hoc network access system may further modify WFDS and ASP2 protocols to remove user verification steps (thereby improving the user experience) and also utilize the Wi-Fi MAC address and radio operating information to improve the group formation process. The modification to the WFDS and ASP2 protocols may include scanning a QR code (which may include the aforementioned public key, Wi-Fi MAC address and radio operating information) from a device seeking to form an ad hoc network with another device and using DPP to verify that the public key belongs to the device. The secure ad hoc network access system may further include a mechanism for removing PIN and push button authentication methods, thereby increasing network device security.

Example embodiments may include embedding capability information about a first device in a QR code that is displayed on the first device. A second device, wishing to form an ad hoc network with the first device, may scan the QR code and store the capability information. The first device and the second device may then perform an ad hoc network formation protocol (e.g., Wi-Fi Direct Services and ASP2). The ad hoc network formation protocol may be modified such that the previously discovered capability information from the QR code is provided without requiring additional user intervention or out-of-band communication.

FIG. 1 is a network diagram illustrating an example wireless network 100 of a flexible connectivity framework system, according to some example embodiments of the present disclosure. Wireless network 100 can include one or more user devices 120 (e.g., 122, 124, 126, or 128), which may communicate in accordance with wireless standards, such as the IEEE 802.11 communication standards. For example, two or more wireless devices may perform connectivity procedures with one another in order to set up Wi-Fi data sessions, according to some example embodiments of the present disclosure. In the example of FIG. 1, a wireless communication channel may be established between two or more wireless devices (e.g., user device(s) 120), where a first user device 120 may correspond to a service seeker, and a second user device 120 may correspond to a service advertiser. A service advertiser may be a wireless device that may advertise and provide one or more of these services over a wireless communication channel. The user device(s) 120 may be wireless devices that are non-stationary and do not have fixed locations. A service seeker may be a wireless device that is seeking certain services, such as printing, playing content, sending, docking, etc.

Systems and methods in accordance with various embodiments of the present disclosure provide a secure ad hoc network access system to set up connectivity between a seeker user device and an advertiser user device by using one or more discovery and connectivity mechanisms in order to connect these devices. Discovery methods may include, at least in part, using a QR code.

In one embodiment, a service advertiser (e.g., user device 122) may display a QR code containing device information, such as a public key, Wi-Fi MAC address, and supported Wi-Fi bands (e.g., 2.4 GHz, 5 GHz, or 60 GHz bands). A service seeker (e.g., user device 126) may read the QR code and store the information about the service advertiser. The service seeker may then send a probe request to discover relevant ASP2 services, as described in the ASP2 specification, except that, in addition, the probe request may include a direct provisioning protocol (DPP) information element containing one or more DPP attributes that may be sent in-band (e.g., device capabilities, cryptographic keys, hashes, and nonces, etc). The service advertiser may then store the DPP attributes for later use.

If the service advertiser has a matching ASP2 service, it may respond as described in the ASP2 specification with the service information, except that it will also include a DPP information element as well, as just described for the service seeker. The service advertiser and the service seeker may then proceed with P2P service discovery and P2P provision discovery, as described in the WFDS or ASP2 technical specifications, except that in addition, the configuration method may be set to "DPP".

After the service advertiser and the service seeker have completed forming a P2P group, DPP message may begin. During the DPP message exchange, the DPP initiator (e.g., the service seeker) may use DPP discovery to ensure that the DPP responder (e.g., the service advertiser) is active and ready for provisioning. Then, a DPP authentication process may be utilized to validate a public key (obtained from the QR code) for the service advertiser. Finally, a DPP configuration process may be performed to verify the DPP attributes which were previously piggybacked on top of the ASP2 message sequence, ultimately producing a DPP connector, which is used by the service advertiser (i.e., the enrolling device) to gain access to the network.

For example, a wireless device (e.g., user device 126) may wish to find a printer (e.g., user device 122) to execute a print job. The wireless device may then broadcast a message, seeking a printing service from another device. The discovery stage may include communication between the two devices (e.g., user devices 124 and 122) using QR code messaging. The printer (e.g., user device 122) may receive the broadcast message and may respond that it is able to perform that service. The discovery stage may allow the user devices 122 and 124 to determine whether the requested service may be accomplished. After the discovery stage, the two user devices may collect connectivity information necessary to establish a Wi-Fi connection between them in order to complete the print job. For example, some of the connectivity information may include the requested/provided service ID, the IDs of the two devices, the interface MAC address, etc. When both devices exchange connectivity information, they may establish a Wi-Fi connection in order to complete the print job. It is understood that this is an example and that other types of services and user devices may be involved.

Figure 5:
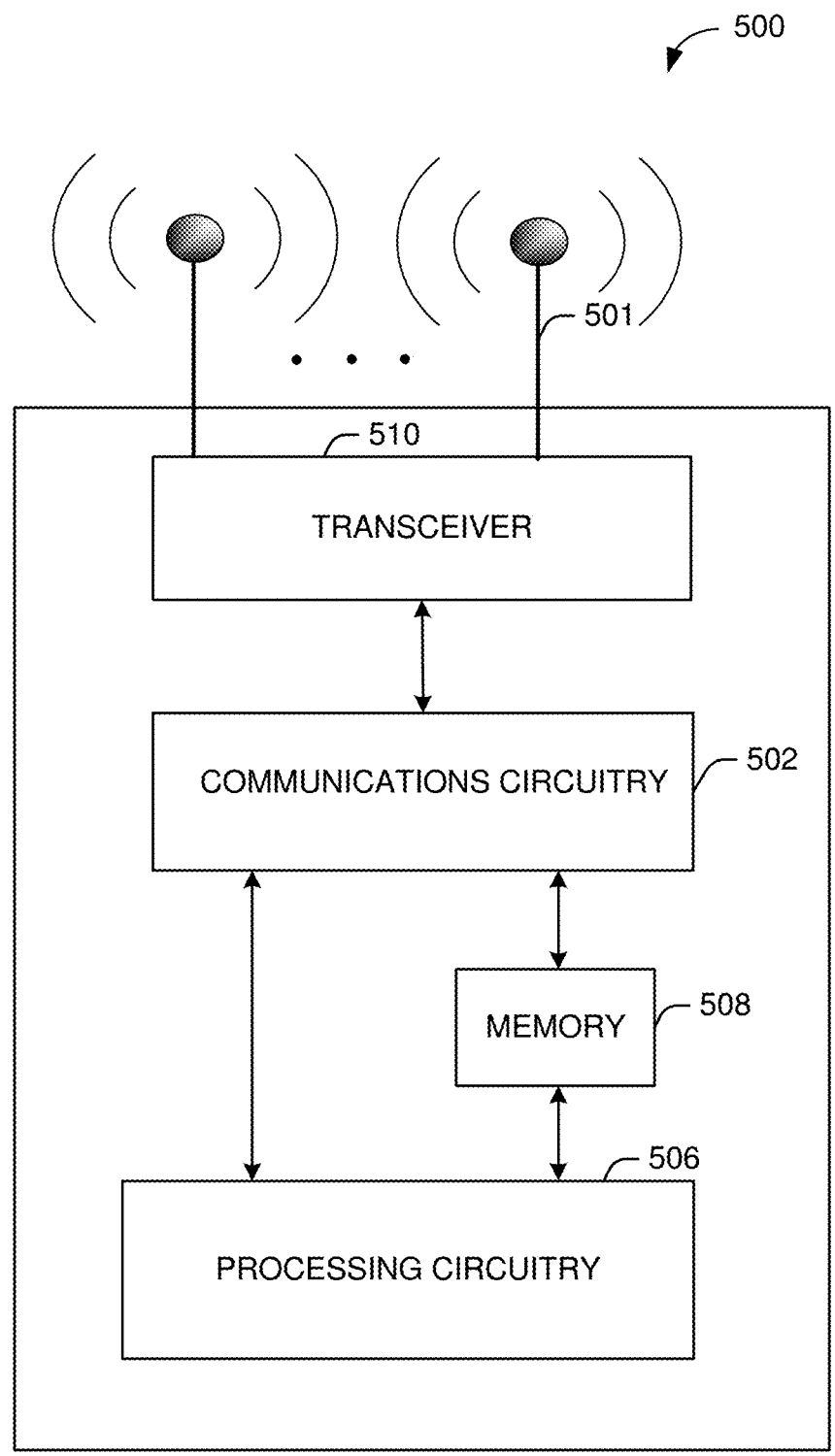
FIG. 5 illustrates a functional diagram of an example communication station that may be suitable for use as a user device, in accordance with one or more example embodiments of the disclosure.
Figure 6:
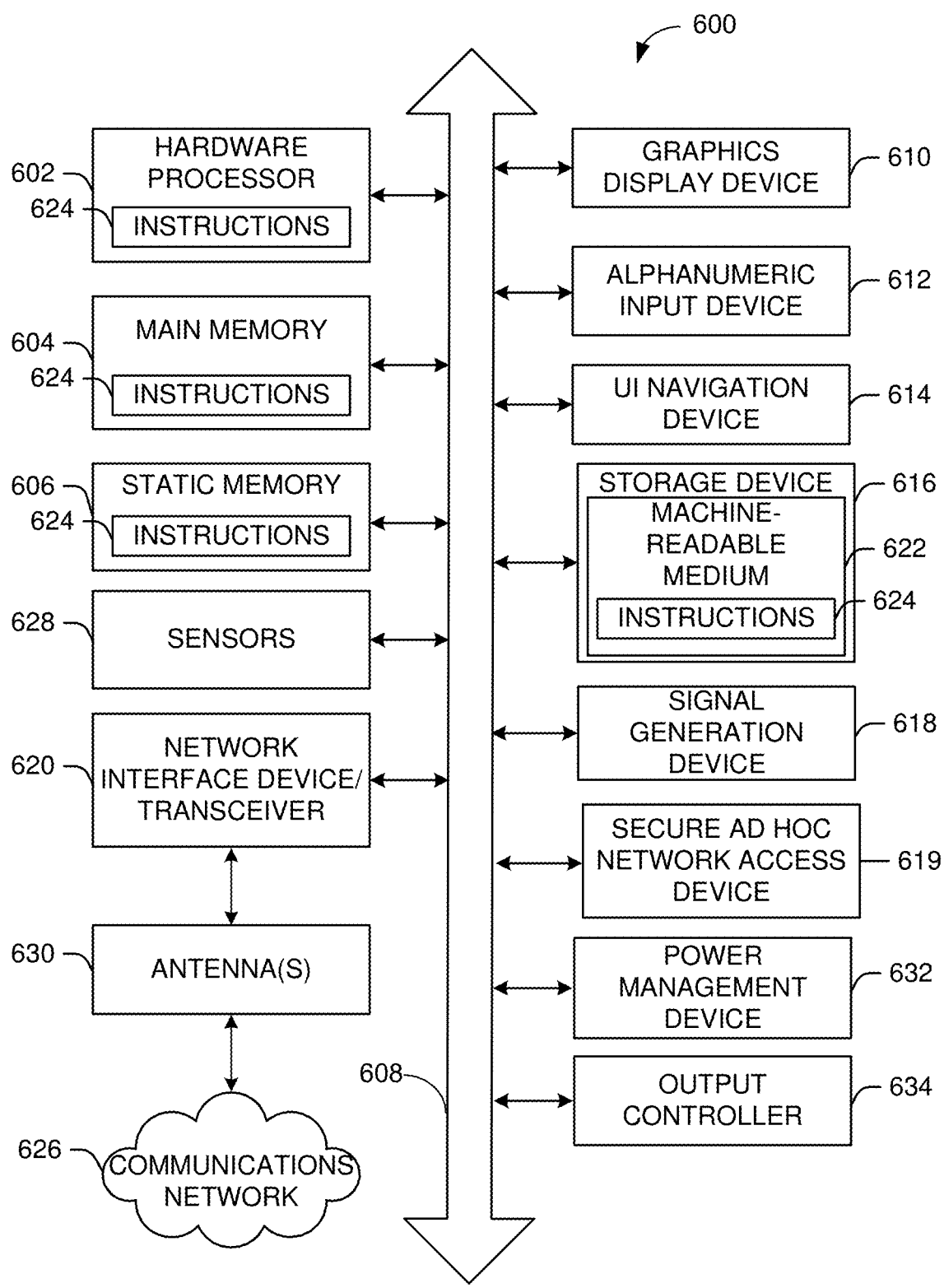
FIG. 6 is a block diagram of an example machine upon which any of one or more techniques (e.g., methods) may be performed, in accordance with one or more embodiments of the disclosure.

In some embodiments, the user devices 120 can include one or more computer systems similar to that of the functional diagram of FIG. 5 and/or the example machine/system of FIG. 6.

One or more illustrative user device(s) 120 may be operable by one or more user(s) 110. The user device(s) 120 (e.g., 122, 124, 126, or 128) may include any suitable processor-driven user device including, but not limited to, a desktop user device, a laptop user device, a server, a router, a switch, an access point, a smartphone, a tablet, a wearable wireless device (e.g., a bracelet, a watch, glasses, a ring, etc.), and so forth.

Any of the user devices 120 (e.g., 122, 124, 126, or 128) may be configured to communicate with each other and any other component of the wireless network 100 directly and/or via one or more communications networks 130, wirelessly or wired.

Any of the communications networks 130 may include, but not be limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 120 (e.g., 122, 124, 126, or 128) may include one or more communications antennas. Communications antennas may be any suitable type of antenna corresponding to the communications protocols used by the user device(s) 120. Some non-limiting examples of suitable communications antennas include Wi-Fi antennas, IEEE 802.11 family of standards compatible antennas, directional antennas, non-directional antennas, dipole antennas, folded dipole antennas, patch antennas, MIMO antennas, or the like. The communications antenna may be communicatively coupled to a radio component to transmit and/or receive signals, such as communications signals, to and/or from the user devices 120 (e.g., 122, 124, 126, or 128).

Any of the user devices 120 (e.g., 122, 124, 126, or 128) may include any suitable radio and/or transceiver for transmitting and/or receiving radio frequency (RF) signals in the bandwidth and/or channels corresponding to the communications protocols utilized by any of the user device(s) 120 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi Direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHz channels (e.g., 802.11ad). In some embodiments, non-Wi-Fi protocols may be used for communications between devices, such as Bluetooth, dedicated short-range communication (DSRC), ultra-high frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

Figure 2:
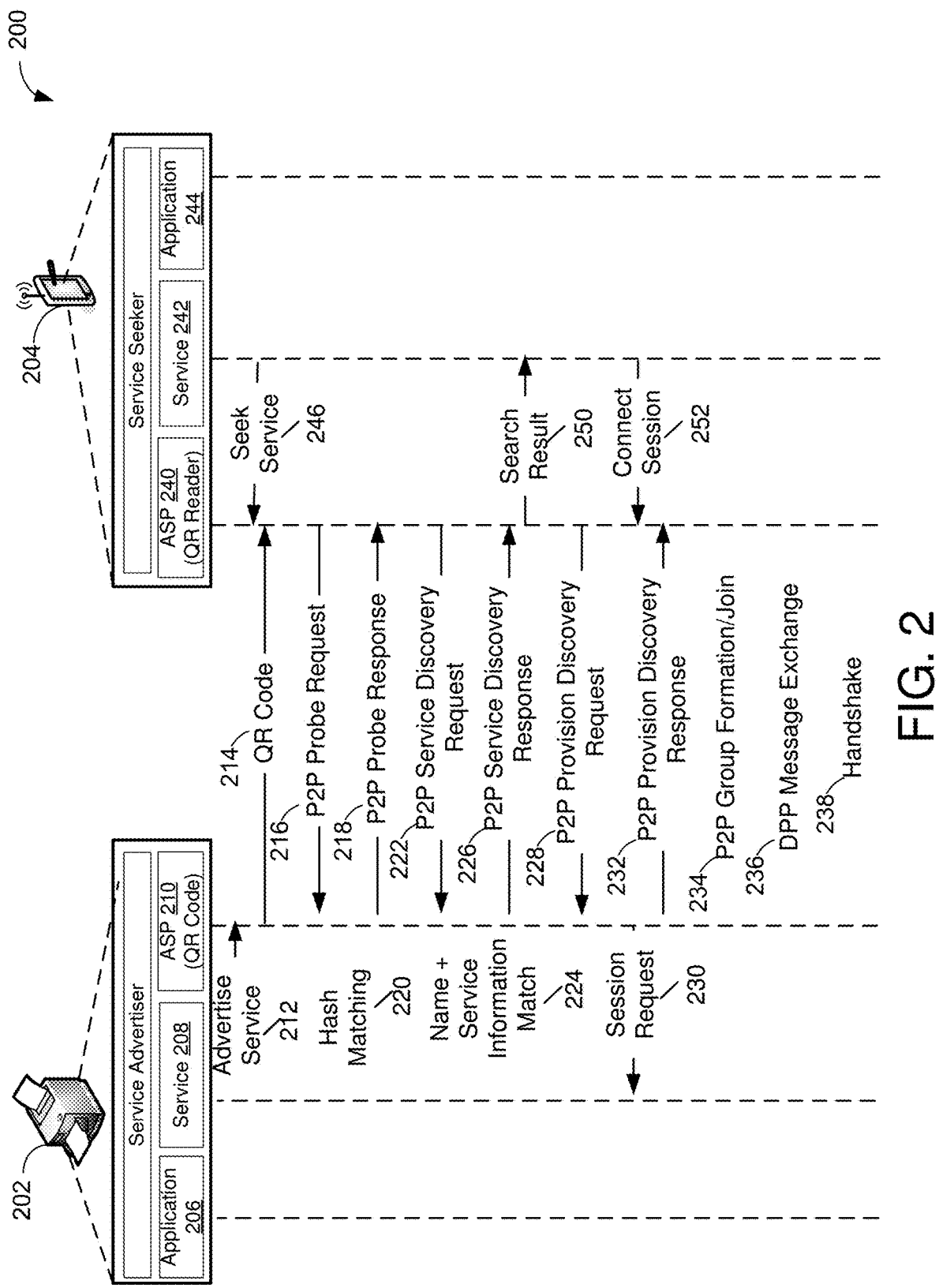
FIG. 2 depicts an illustrative schematic diagram of an example wireless communications stack including discovery and connectivity methods based on the Application Service Platform Release 2 (ASP2), in accordance with one or more embodiments of the disclosure.

FIG. 2 depicts an illustrative schematic diagram of an example wireless communications stack 200 including discovery and connectivity methods using a secure ad hoc network access system and based on ASP2, in accordance with one or more embodiments of the disclosure.

The wireless communication stack of FIG. 2 includes a service advertiser 202 and a service seeker 204. The service advertiser 202 may provide an application 206, a service 208, and an application service platform (ASP) 210. Similarly, the service seeker 204 may provide an application 244, a service 242, and an ASP 240. The services 208 and 242 may include various services that may be provided or used by a user device 120 such as, but not limited to, a send service, a play service, a print service, a display service, a Wi-Fi serial bus (WSB) service, a docking service, or other services. The services 208 and 242 may support wireless serial protocols, such as Wi-Fi serial bus (WSB). The services 208 and 242 may be any service defined by the ASP and/or ASP2, which may be referred to for more detail, such as sending content, playing content, printing content, displaying content, docking, WSB, etc.

The ASP 210 and the ASP 240 may function in conjunction with the services 208 and 242 (as well as the applications 206 and 244) to provide discovery and topology mechanisms. Discovery refers to the ability of the user device(s) 120 to discover each other using one or more protocols. For example, under ASP2, discovery may include P2P service discovery and P2P provisioning discovery. Topology may include connectivity topologies that facilitate the connection between the two or more user device(s) 120. For example, topology may use a P2P infrastructure.

In one embodiment, the service 208 in the secure ad hoc network access system may advertise a service 212 to the ASP 210 which may include a QR code containing device information such as a public key, Wi-Fi MAC addresses, and supported Wi-Fi bands (e.g., 2.4 GHz, 5 GHz, or 60 GHz bands). The ASP 210 may then cause the service advertiser 202 to display the QR code containing the aforementioned device information. The ASP 240 may then cause the service seeker 204 to read the QR code using a QR reader to receive the QR code (e.g., message 214). The ASP 210 may store the device information included in the QR code associated the service advertiser 202. The service 242 may further cause the service seeker 204 to seek a service 246 from the service advertiser 202. It should be understood that the use of a QR code in various embodiments may offer several advantages over other out-of-band methods such as near field communication (NFC). For example, under an NFC method, the responding device may be required to have, at minimum, a passive NFC tag and the initiating device may be required to have an active NFC reader. Thus, the QR code method discussed above may provide significant cost savings over NFC since the responding device only needs a static QR code and the initiating device may already include a built-in imaging device (e.g., a camera) which may be used as a QR code reader.

The ASP 240 may then cause the service seeker 204 to send a P2P probe request 216 (which may be encoded as a hash value) to discover relevant ASP2 services (as described in the ASP2 specification) in the service advertiser 202. The P2P probe request 216 may additionally include an information element (IE) containing IE attributes (e.g., DPP attributes) that may be sent in-band. For example, the DPP attributes may include device capabilities, cryptographic keys, hashes, nonces, etc.). The service advertiser 202 may then store the information element for later use.

The service advertiser 202 may then determine if it has a matching ASP2 service (e.g., through hash matching 220) and if so, may respond, via the ASP 210, with a P2P probe response 218. The P2P probe response 218 may include a response with service information (e.g., service name(s), advertisement ID, and service configuration methods) as described in the ASP2 specification. The P2P probe response 218 may additionally include the IE and DPP in-band attributes sent in the P2P probe request 216.

The service seeker 204 may then cause the ASP 240 to send a P2P service discovery request 222, which may include service names and a service information request, to the ASP 210, as described in the ASP2 specification.

The ASP 210 may then perform service name and service information matching 224 and, if a match is found, send a P2P service discovery response 226 to the ASP 240. The P2P service discovery response 226 may include service name, advertisement ID, service status, and service configuration methods, as described in the ASP2 specification. The ASP 240 may then send a search result 250 to the service 242 and the service 242 may return a connect session 252 message to the ASP 240.

The ASP 240 may then send a P2P provisioning discovery request 228 to the ASP 210 as described in the ASP2 and/or WFDS specifications. The P2P provisioning discovery request 228 may additionally include a configuration method that is set to DPP. The ASP 210 may then send a session request 230 message to the service 208.

The ASP 210 may then send a P2P provisioning discovery response 232 to the ASP 240 as described in the ASP2 and/or WFDS specifications including status information. The P2P provisioning discovery response 232 may additionally include a configuration method that is set to DPP. The ASP 240 may then send a session configuration request message for using DPP to the service 242.

The service advertiser 202 and the service seeker 204 may then form a P2P group 234. In one embodiment, the service advertiser 202 may join an existing P2P group formed by the service seeker 204.

After the service advertiser 202 and the service seeker 204 have completed P2P group formation, DPP message exchange 236 between the two devices may be initiated. DPP message exchange will be described in greater detail below with respect to the description of FIG. 3.

After the service advertiser 202 and the service seeker 204 have completed DPP message exchange, the two devices may participate in a handshake 238 (e.g., a 4-way handshake) to enroll the service advertiser 202 into the ad hoc network formed by the P2P group.

In one embodiment, the implementation of the secure ad hoc network access system described above may use language primitives, as defined in the WFDS specification. It is understood that language primitives are the simplest elements available in a programming language. For example, one or more primitives defined in WFDS, such as AdvertiseService( ), SeekService( ), SearchResult( ), Status( ), and ConnectSession( ) may be used.

Figure 3:
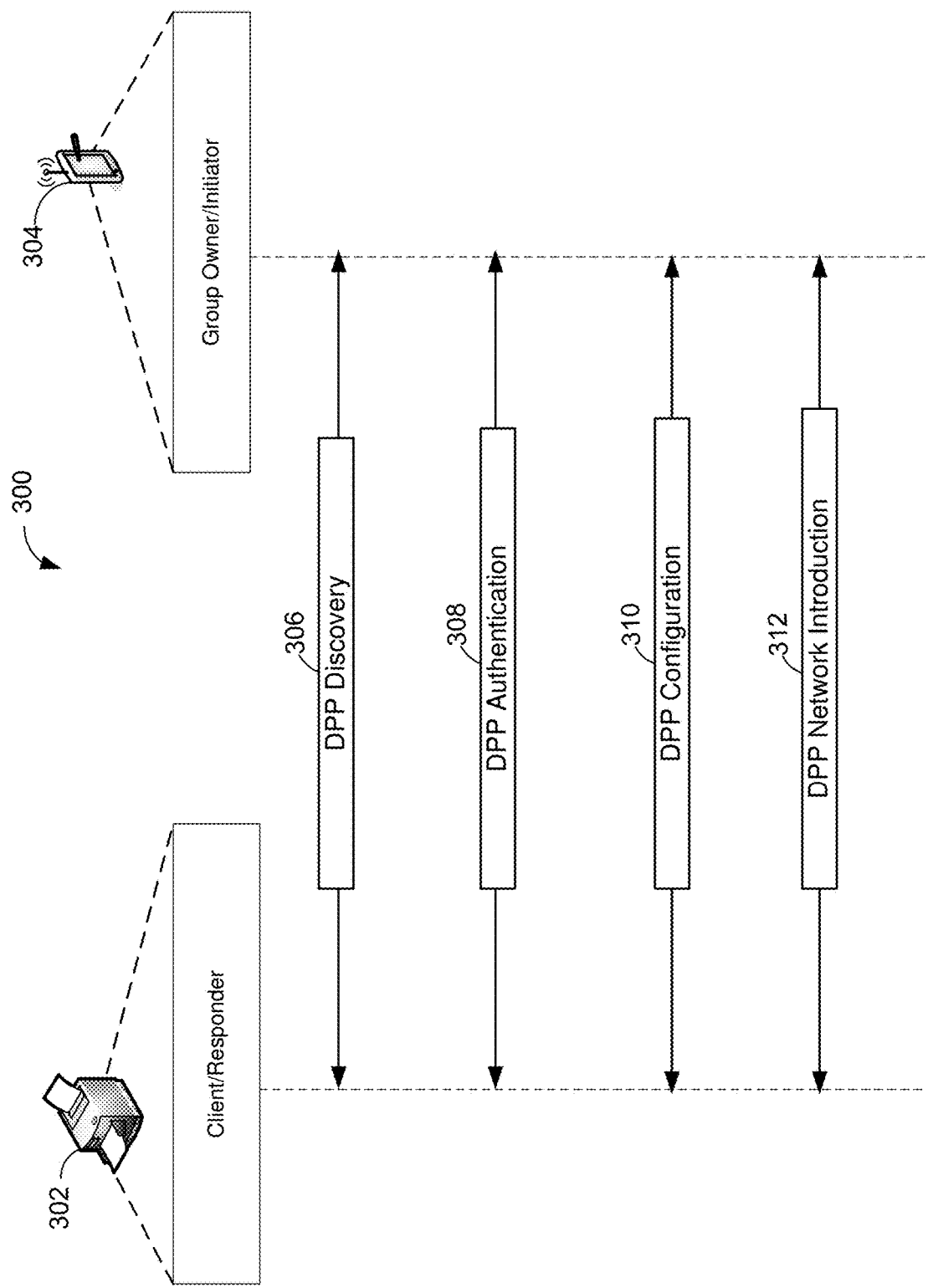
FIG. 3 depicts an example of an illustrative schematic message flow between components of a secure ad hoc network access system, in accordance with one or more embodiments of the disclosure.

FIG. 3 depicts an example message flow 300 between components of a secure ad hoc network access system, in accordance with one or more embodiments of the disclosure.

Referring to FIG. 3, there is shown a client/responder device 302 (e.g., a service advertiser device) and a group owner/initiator device 304 (e.g., a service seeker device) that may wish to set up connectivity between each other based on the various services that are offered by the service advertiser device and based on the services needed by the service seeker device. In one embodiment, the group owner/initiator device 304 may use a DPP discovery message 306 to ensure that the client/responder device 302 is active and ready for provisioning. Then, a DPP authentication process message 308 validates a public key for the client/responder device 302 (obtained earlier via QR code as described above in FIG. 2). Then, a DPP configuration process message 310 may verify the DPP attributes which were previously piggybacked on top of the ASP2 message sequence (described above in FIG. 2), ultimately producing a DPP connector, which is used by the enrolling device to gain access to the network via a DPP network introduction message 312. As discussed above, DPP uses public key cryptography for authentication. In accordance with DPP, each device has a public and private key pair. The use of DPP in accordance with embodiments of the disclosure obviates the need for PIN and push button authentication methods, thereby increasing network device security.

Figure 4A:
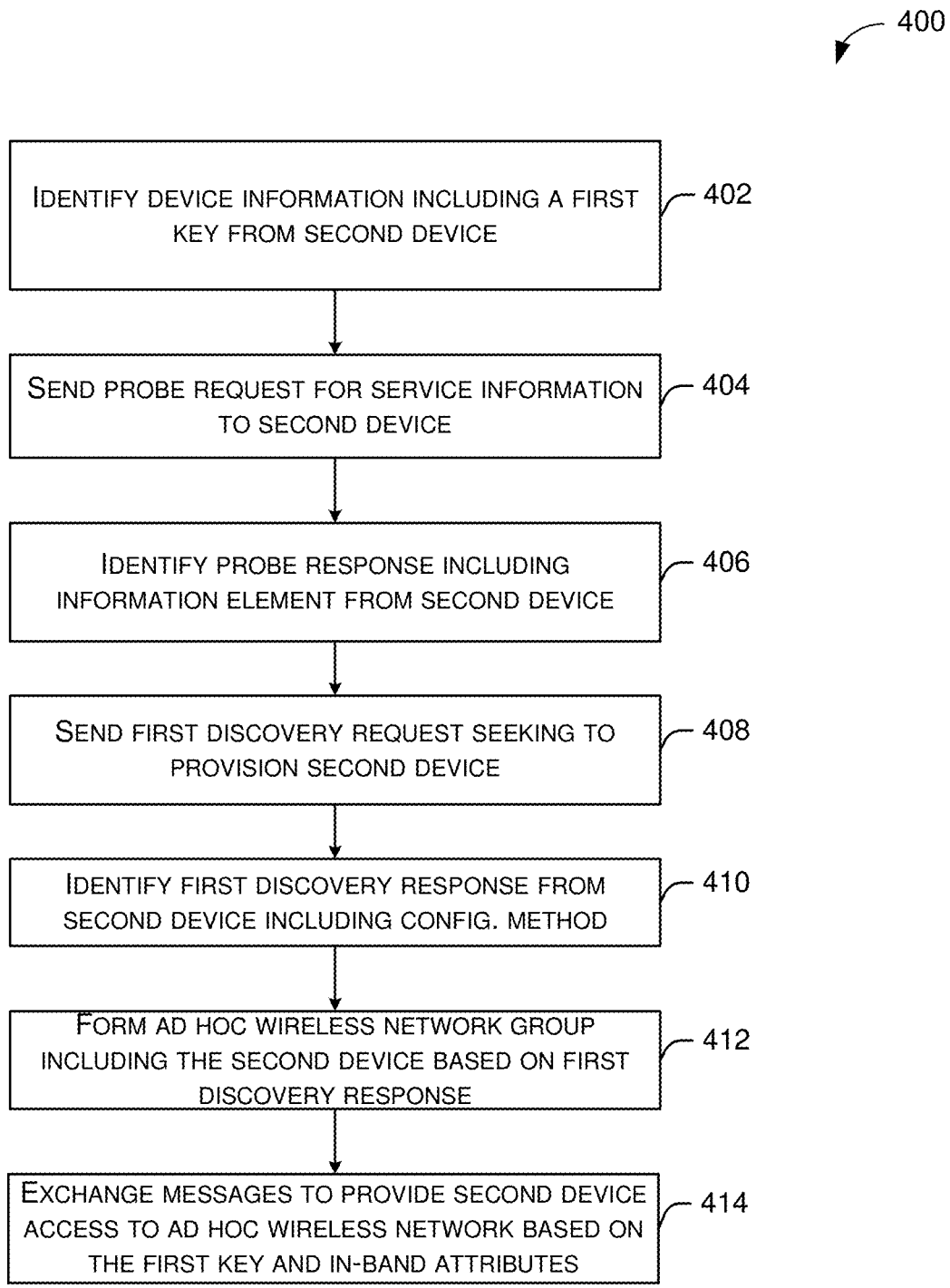
FIG. 4A depicts a flow diagram of an illustrative process for an illustrative secure ad hoc network access system, in accordance with one or more embodiments of the disclosure.

FIG. 4A illustrates a flow diagram of an illustrative process 400 for a secure ad hoc network access system, in accordance with one or more embodiments of the disclosure.

At block 402, a user device (e.g., a service seeker device) may identify device information including a first key from a second device (e.g., a service advertiser device) in conjunction with seeking a service. In one embodiment, the device information may be a QR code and further include a MAC address and Wi-Fi band information (e.g., 2.4 GHz, 5 GHz, or 60 GHz bands). For example, the service seeker device may be a wireless device that is seeking certain services (e.g., printing, playing, sending, docking, etc.). The service advertiser device may be a wireless device that may advertise and provide one or more of these services over a wireless communication channel.

At block 404, the user device may send a probe request for service information to the second device. The probe request may include an information element including one or more in-band attributes. The information element may be a DPP information element and the attributes may include one or more DPP attributes which may include, without limitation, device capability information, a cryptographic key (e.g., a private key), a hash, or a nonce.

At block 406, the user device may identify one or more probe responses, including the information element and the one or more in-band attributes contained therein, received from the second device.

At block 408, the user device may send a first discovery request seeking to provision the second device. The first discovery request may include a configuration method corresponding to the one or more in-band attributes in the information element described at block 404.

At block 410, the user device may identify a first discovery response from the second device including the configuration method in the first discovery request described at block 408. In one embodiment, the user device may be configured to also send a second discovery request (which may be communicated prior to the first discovery request) to the second user device. The second discovery request may be a request for service information sent to the second user device. The user device may further be configured to identify a second discovery response from the second device including the requested service information.

At block 412, the device may form an ad hoc wireless network group based at least in part on the first discovery response. For example, the device may utilize a configuration method (received in a DPP information element) corresponding to one or more DPP in-band attributes to form a P2P network group.

At block 414, the user device may exchange one or more messages with the second device for providing an access (e.g. a wireless access) for the second device to the ad hoc wireless network group formed at block 412. It is understood that the above descriptions are for purposes of illustration and are not meant to be limiting.

Figure 4B:
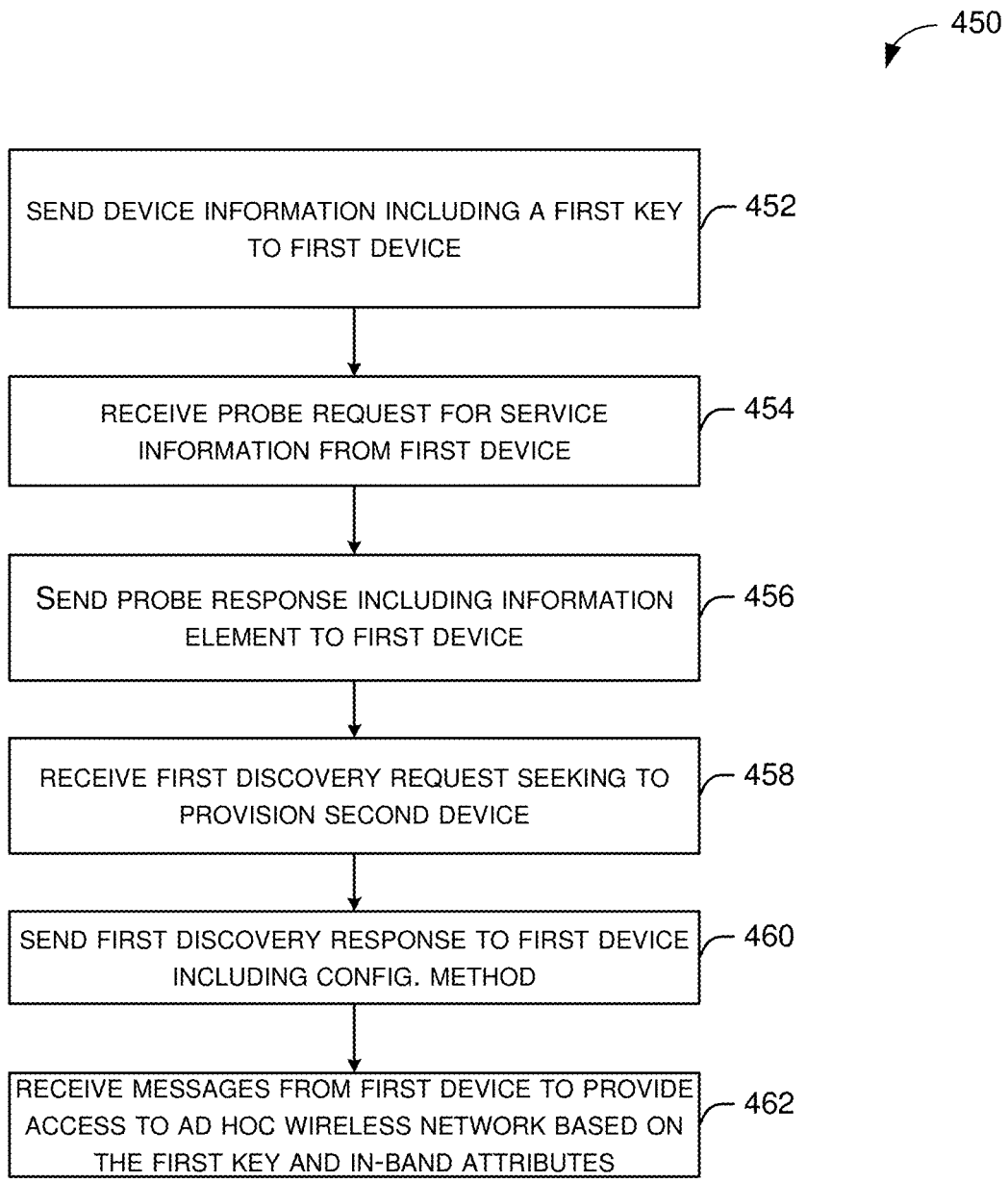
FIG. 4B depicts a flow diagram of an illustrative process for an illustrative secure ad hoc network access system, in accordance with one or more embodiments of the disclosure.

FIG. 4B illustrates a flow diagram of an illustrative process 450 for a secure ad hoc network access system, in accordance with one or more embodiments of the disclosure.

At block 452, a user device (e.g., a service advertiser device) may send device information including a first key to a first device (e.g., a service seeker device) including a first key. In one embodiment, the device information may be a QR code and further include a MAC address and Wi-Fi band information (e.g., 2.4 GHz, 5 GHz, or 60 GHz bands).

At block 454, the user device may receive a probe request for service information from the first device. The probe request may include an information element including one or more in-band attributes. The information element may be a DPP information element and the attributes may include one or more DPP attributes which may include, without limitation, device capability information, a cryptographic key (e.g., a private key), a hash, or a nonce.

At block 456, the user device may send one or more probe responses, including the information element and the one or more in-band attributes contained therein, to the first device.

At block 458, the user device may receive a first discovery request seeking to provision the user device.

At block 460, the user device may send a first discovery response to the first device including a configuration method. In one embodiment, the user device may be configured to also receive a second discovery request for requested service information and send a second discovery response including the requested service information.

At block 462, the user device may receive one or more messages from the first device for providing an access (e.g. a wireless access) to the ad hoc wireless network group formed at block 412. It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as a user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 2, 3, 4A and 4B.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a secure ad hoc network access device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The secure ad hoc network access device 619 may carry out or perform any of the operations and processes (e.g., processes 400 and 450) described and shown above.

For example, the secure ad hoc network access device 619 may be configured to facilitate discovery between two user devices using out-of-band (non-Wi-Fi) discovery and Wi-Fi discovery procedures to ensure that the necessary information needed to set up a connection is exchanged between these user devices. For example, the secure ad hoc network access device 619 may perform an out-of-band (non-Wi-Fi) discovery procedure using quick response (QR) code discovery using QR protocol(s). The secure ad hoc network access device 619 may carry out a Wi-Fi discovery procedure in Peer-to-Peer (P2P) discovery using P2P protocol(s).

In one embodiment, the secure ad hoc network access device 619 may provide a mechanism whereby a device's public key, Wi-Fi media access control (MAC) address, and radio operating frequencies may be encoded in a Quick Response (QR) code.

The secure ad hoc network access device 619 may further modify WFDS and ASP2 protocols to remove user verification steps (thereby improving the user experience) and also utilize the Wi-Fi MAC address and radio operating information to improve the group formation process.

The secure ad hoc network access device 619 may further include a mechanism for removing PIN and push button authentication methods, thereby increasing network device security.

It is understood that the above are only a subset of what the secure ad hoc network access device 619 may be configured to perform and that other functions included throughout this disclosure may also be performed by the secure ad hoc network access device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include memory and processing circuitry configured to identify device information including a first key received from a first device. The memory and processing circuitry may be further configured to cause to send a probe request for service information to the first device. The probe request may include an information element including one or more in-band attributes. The memory and processing circuitry may be further configured to identify one or more probe responses, including the information element, received from the first device. The memory and processing circuitry may be further configured to cause to send a first discovery request seeking to provision the first device. The discovery request may include a configuration method corresponding to the one or more in-band attributes. The memory and processing circuitry may be further configured to identify a first discovery response from the first device including the configuration method. The memory and processing circuitry may be further configured to cause to form an ad hoc wireless network group based at least in part on the first discovery response. The memory and processing circuitry may be further configured to cause to exchange one or more messages to provide access for the first device to the ad hoc wireless network group based at least in part on the first key and the one or more in-band attributes.

The implementations may include one or more of the following features. The memory and processing circuitry may be further configured to cause to send a second discovery request for service information to the first device. The memory and processing circuitry may be further configured to identify a second discovery response from the first device including the service information. The device information may include a quick response (QR) code including the first key and one or more of a media access control (MAC) address and Wi-Fi band information associated with the first device. The first key may be a public key. The one or more in-band attributes may include one or more device provisioning protocol (DPP) attributes. The one or more DPP attributes may include device capability information, a second key, a hash, or a nonce. The second key may be a private key. The ad hoc wireless network group may be a peer-to-peer (P2P) network group. The device may further include a transceiver configured to transmit and receive wireless signals. The device may further include one or more antennas coupled to the transceiver.

According to example embodiments of the disclosure, there may be a device. The device may include memory and processing circuitry configured to cause to send, to a first device, device information including a first key. The memory and processing circuitry may be further configured to receive, from the first device, a probe request for service information. The probe request may include an information element including one or more in-band attributes. The memory and processing circuitry may be further configured to cause to send, to the first device, one or more probe responses including the information element. The memory and processing circuitry may be further configured to receive a first discovery request seeking to provision the second device. The discovery request may include a configuration method corresponding to one or more in-band attributes. The memory and processing circuitry may be further configured to cause to send a first discovery response to the first device including the configuration method. The memory and processing circuitry may be further configured to receive, from the first device, one or more messages to provide access to an ad hoc wireless network group based at least in part on the first key and the one or more in-band attributes.

The implementations may include one or more of the following features. The memory and processing circuitry may be further configured to receive, from the first device, a second discovery request for service information. The memory and processing circuitry may be further configured to cause to send, to the first device, a second discovery response including the service information. The device information may include a quick response (QR) code including the first key and one or more of a media access control (MAC) address and Wi-Fi band information associated with the second device. The first key may be a public key. The one or more in-band attributes may include one or more device provisioning protocol (DPP) attributes. The one or more DPP attributes may include device capability information, a second key, a hash, or a nonce. The second key may be a private key. The ad hoc wireless network group may be a peer-to-peer (P2P) network group. The device may further include a transceiver configured to transmit and receive wireless signals. The device may further include one or more antennas coupled to the transceiver.

According to example embodiments of the disclosure, there may be a non-transitory computer-readable medium storing computer-executable instructions which, when executed by a processor, cause the processor to perform operations. The operations may include identifying device information including a first key received from a first device. The operations may further include causing to send a probe request for service information to the first device. The probe request may include an information element including one or more in-band attributes. The operations may further include identifying one or more probe responses, including the information element, received from the first device. The operations may further include causing to send a first discovery request seeking to provision the first device. The discovery request may include a configuration method corresponding to the one or more in-band attributes. The operations may further include identifying a first discovery response from the first device including the configuration method. The operations may further include forming an ad hoc wireless network group based at least in part on the first discovery response. The operations may further include causing to exchange one or more messages to provide access for the first device to the ad hoc wireless network group based at least in part on the first key and the one or more in-band attributes.

The implementations may include one or more of the following features. The operations may further include causing to send a second discovery request for service information to the first device. The operations may further include identifying a second discovery response from the first device including the service information. The device information may include a quick response (QR) code including the first key and one or more of a media access control (MAC) address and Wi-Fi band information associated with the first device. The first key may be a public key. The one or more in-band attributes may include one or more device provisioning protocol (DPP) attributes. The one or more DPP attributes may include device capability information, a second key, a hash, or a nonce. The second key may be a private key. The ad hoc wireless network group may be a peer-to-peer (P2P) network group.

According to example embodiments of the disclosure, there may be a non-transitory computer-readable medium storing computer-executable instructions which, when executed by a processor, cause the processor to perform operations. The operations may include causing to send, to a first device, device information including a first key. The operations may further include receiving, from the first device, a probe request for service information. The probe request may include an information element including one or more in-band attributes. The operations may further include causing to send, to the first device, one or more probe responses including the information element. The operations may further include receiving a first discovery request seeking to provision the second device. The discovery request may include a configuration method corresponding to one or more in-band attributes. The operations may further include causing to send a first discovery response to the first device including the configuration method. The operations may further include receiving, from the first device, one or more messages to provide access to an ad hoc wireless network group based at least in part on the first key and the one or more in-band attributes.

The implementations may include one or more of the following features. The operations may further include receiving, from the first device, a second discovery request for service information. The operations may further include causing to send, to the first device, a second discovery response including the service information. The device information may include a quick response (QR) code including the first key and one or more of a media access control (MAC) address and Wi-Fi band information associated with the second device. The first key may be a public key. The one or more in-band attributes may include one or more device provisioning protocol (DPP) attributes. The one or more DPP attributes may include device capability information, a second key, a hash, or a nonce. The second key may be a private key. The ad hoc wireless network group may be a peer-to-peer (P2P) network group.

According to example embodiments of the disclosure, there may include a method. The method may include identifying, by a first device, device information including a first key received from a second device. The method may further include causing to send, by the first device, a probe request for service information to the second device. The probe request may include an information element including one or more in-band attributes. The method may further include identifying, by the first device, one or more probe responses, including the information element, received from the second device. The method may further include causing to send, by the first device, a first discovery request seeking to provision the second device. The discovery request may include a configuration method corresponding to the one or more in-band attributes. The method may further include identifying, by the first device, a first discovery response from the second device including the configuration method. The method may further include causing, by the first device, to form an ad hoc wireless network group based at least in part on the first discovery response. The method may further include causing, by the first device, to exchange one or more messages to provide access for the second device to the ad hoc wireless network group based at least in part on the first key and the one or more in-band attributes.

The implementations may include one or more of the following features. The method may further include causing, by the first device, to send a second discovery request for service information to the second device. The method may further include identifying, by the first device, a second discovery response from the second device including the service information. The device information may include a quick response (QR) code including the first key and one or more of a media access control (MAC) address and Wi-Fi band information associated with the second device. The first key may be a public key. The one or more attributes may include one or more device provisioning protocol (DPP) attributes. The one or more DPP attributes may include device capability information, a second key, a hash, or a nonce. The second key may be a private key. The ad hoc wireless network group may be a peer-to-peer (P2P) network group.

According to example embodiments of the disclosure, there may include a method. The method may include causing to send, to a first device, device information including a first key. The method may further include receiving, from the first device, a probe request for service information. The probe request may include an information element including one or more in-band attributes. The method may further include causing to send, to the first device, one or more probe responses including the information element. The method may further include receiving a first discovery request seeking to provision the second device. The discovery request may include a configuration method corresponding to one or more in-band attributes. The method may further include causing to send a first discovery response to the first device including the configuration method. The method may further include receiving, from the first device, one or more messages to provide access to an ad hoc wireless network group based at least in part on the first key and the one or more in-band attributes.

The implementations may include one or more of the following features. The method may further include receiving, from the first device, a second discovery request for service information. The method may further include causing to send, to the first device, a second discovery response including the service information. The device information may include a quick response (QR) code including the first key and one or more of a media access control (MAC) address and Wi-Fi band information associated with the second device. The first key may be a public key. The one or more in-band attributes may include one or more device provisioning protocol (DPP) attributes. The one or more DPP attributes may include device capability information, a second key, a hash, or a nonce. The second key may be a private key. The ad hoc wireless network group may be a peer-to-peer (P2P) network group.

In example embodiments of the disclosure, there may be an apparatus. The apparatus may include means for identifying, by a first device, device information including a first key received from a second device. The apparatus may include means for causing to send, by the first device, a probe request for service information to the second device. The probe request may include an information element including one or more in-band attributes. The apparatus may include means for identifying, by the first device, one or more probe responses, including the information element, received from the second device. The apparatus may include means for causing to send, by the first device, a first discovery request seeking to provision the second device. The discovery request may include a configuration method corresponding to the one or more in-band attributes. The apparatus may include means for identifying, by the first device, a first discovery response from the second device including the configuration method. The apparatus may include means for causing, by the first device, to form an ad hoc wireless network group based at least in part on the first discovery response. The apparatus may include means for causing, by the first device, to exchange one or more messages to provide access for the second device to the ad hoc wireless network group based at least in part on the first key and the one or more in-band attributes.

The implementations may include one or more of the following features. The apparatus may include means for causing, by the first device, to send a second discovery request for service information to the second device. The apparatus may include means for identifying, by the first device, a second discovery response from the second device including the service information. The device information may include a quick response (QR) code including the first key and one or more of a media access control (MAC) address and Wi-Fi band information associated with the second device. The first key may be a public key. The one or more attributes may include one or more device provisioning protocol (DPP) attributes. The one or more DPP attributes may include device capability information, a second key, a hash, or a nonce. The second key may be a private key. The ad hoc wireless network group may be a peer-to-peer (P2P) network group.

According to example embodiments of the disclosure, there may include an apparatus. The apparatus may include means for causing to send, to a first device, device information including a first key. The apparatus may include means for receiving, from the first device, a probe request for service information. The probe request may include an information element including one or more in-band attributes. The apparatus may include means for causing to send, to the first device, one or more probe responses including the information element. The apparatus may include means for receiving a first discovery request seeking to provision the second device. The discovery request may include a configuration method corresponding to one or more in-band attributes. The apparatus may include means for causing to send a first discovery response to the first device including the configuration method. The apparatus may include means for receiving, from the first device, one or more messages to provide access to an ad hoc wireless network group based at least in part on the first key and the one or more in-band attributes.

The implementations may include one or more of the following features. The apparatus may include means for receiving, from the first device, a second discovery request for service information. The apparatus may include means for causing to send, to the first device, a second discovery response including the service information. The device information may include a quick response (QR) code including the first key and one or more of a media access control (MAC) address and Wi-Fi band information associated with the second device. The first key may be a public key. The one or more in-band attributes may include one or more device provisioning protocol (DPP) attributes. The one or more DPP attributes may include device capability information, a second key, a hash, or a nonce. The second key may be a private key. The ad hoc wireless network group may be a peer-to-peer (P2P) network group.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for establishing a device-to-device connection using device provisioning protocol (DPP), the device comprising a storage device and processing circuitry, the processing circuity coupled to the storage, and the processing circuity configured to:
   cause to scan a quick response (QR) code of a first device, wherein the QR code comprises device information based on a first key, a global operating class, and supported Wi-Fi bands;
   store the device information in the storage device;
   select a device provisioning protocol (DPP) configuration method;
   determine one or more DPP attributes associated with the DPP configuration method;

cause to send a probe request to the first device to discover a possible match for one or more services associated with the first device, wherein the probe request comprises the DPP attributes;

identify a probe response indicating a match for at least one of the one or more services, wherein the probe request includes a DPP information element (IE) associated with the DPP attributes of the probe request;

perform DPP provisioning with the first device using the DPP attributes; establish a connection with the first device based on the DPP provisioning;

cause to form an ad hoc wireless network group based at least in part on the probe response; and cause to exchange one or more messages to provide access for the first device to the ad hoc wireless network group based at least in part on the first key and the DPP attributes.

2. The device of claim 1, wherein the processing circuitry is further configured to perform DPP authentication to validate the first key obtained from the QR code as part of performing DPP provisioning.

3. The device of claim 1, wherein the processing circuitry is further configured to perform DPP configuration to verify the DPP attributes as part of performing DPP provisioning.

4. The device of claim 1, wherein the first key comprises a public key.

5. The device of claim 1, wherein the DPP attributes comprise device capability information, a second key, a hash, or a nonce, wherein the second key comprises a private key.

6. The device of claim 1, wherein to perform DPP configuration comprises the processing circuitry being further configured to determine a connector to be used to gain access to a network.

7. The device of claim 1, further comprising a transceiver configured to cause the transmission and reception of wireless signals.

8. The device of claim 7, further comprising one or more antennas coupled to the transceiver, wherein the one or more antennas are configured to send the probe request.

9. A non-transitory computer-readable medium storing computer-executable instructions which, when executed by one or more processors result in performing operations comprising:

causing to scan a quick response (QR) code of a first device, wherein the QR code comprises device information based on a first key, a global operating class, and supported Wi-Fi bands;

storing the device information in a storage device;

selecting a device provisioning protocol (DPP) configuration method;

determining one or more DPP attributes associated with the DPP configuration method;

causing to send a probe request to the first device to discover a possible match for one or more services associated with the first device, wherein the probe request comprises the DPP attributes;

identifying a probe response indicating a match for at least one of the one or more services, wherein the probe request includes a DPP information element (IE) associated with the DPP attributes of the probe request;

performing DPP provisioning with the first device using the DPP attributes;

establishing a connection with the first device based on the DPP provisioning;

cause to form an ad hoc wireless network group based at least in part on the probe response; and cause to exchange one or more messages to provide access for the first device to the ad hoc wireless network group based at least in part on the first key and the one or more DPP attributes.

10. The non-transitory computer-readable medium of claim 9, further comprising performing DPP authentication to validate the first key obtained from the QR code as part of performing DPP provisioning.

11. The non-transitory computer-readable medium of claim 9, wherein the one or more DPP attributes comprise device capability information, a second key, a hash, or a nonce, wherein the second key comprises a private key.

12. The non-transitory computer-readable medium of claim 9, wherein to perform DPP configuration comprises the processing circuitry being further configured to determine a connector to be used to gain access to a network.

13. The non-transitory computer-readable medium of claim 9, wherein the operations further comprise performing DPP configuration to verify the DPP attributes as part of performing DPP provisioning.

14. The non-transitory computer-readable medium of claim 13, wherein the first key comprises a public key.

15. A method comprising:

causing to scan, by one or more processors, a quick response (QR) code of a first device, wherein the QR code comprises device information based on a first key, a global operating class, and supported Wi-Fi bands;

storing the device information in a storage device;

selecting a device provisioning protocol (DPP) configuration method;

determining one or more DPP attributes associated with the DPP configuration method;

causing to send a probe request to the first device to discover a possible match for one or more services associated with the first device, wherein the probe request comprises the DPP attributes;

identifying a probe response indicating a match for at least one of the one or more services, wherein the probe request includes a DPP information element (IE) associated with the DPP attributes of the probe request;

performing DPP provisioning with the first device using the DPP attributes; and establishing a connection with the first device based on the DPP provisioning;

causing, by the first device, to form an ad hoc wireless network group based at least in part on the probe response; and causing, by the first device, to exchange one or more messages to provide access for the second device to the ad hoc wireless network group based at least in part on the first key and the one or more DPP attributes.

16. The method of claim 15, further comprising performing DPP authentication to validate the first key obtained from the QR code as part of performing DPP provisioning.

17. The method of claim 15, wherein the one or more attributes comprises one or more device provisioning protocol (DPP) attributes, the one or more DPP attributes comprising device capability information, a second key, a hash, or a nonce, wherein the second key comprises a private key.

18. The method of claim 15, wherein to perform DPP configuration comprises the processing circuitry being further configured to determine a connector to be used to gain access to a network.

19. The method of claim 15, further comprising performing DPP configuration to verify the DPP attributes as part of performing DPP provisioning.

20. The method of claim 19, wherein the first key comprises a public key.

\* \* \* \* \*